(12) United States Patent
Kentopp

(10) Patent No.: US 7,901,333 B1
(45) Date of Patent: Mar. 8, 2011

(54) SELF CENTERING STEERING MECHANISM

(76) Inventor: Richard Kentopp, Rockwall, TX (US)

(*) Notice: Subject to any disclaimer, the term of this patent is extended or adjusted under 35 U.S.C. 154(b) by 94 days.

(21) Appl. No.: 12/072,054

(22) Filed: Feb. 22, 2008

Related U.S. Application Data

(60) Provisional application No. 60/902,965, filed on Feb. 24, 2007.

(51) Int. Cl.
*A63B 69/16* (2006.01)
*A63B 71/00* (2006.01)
*G09B 9/04* (2006.01)

(52) U.S. Cl. .................. 482/57; 434/61; 482/8

(58) Field of Classification Search .............. 482/51–53, 482/57, 1–9, 58–65; 434/61
See application file for complete search history.

(56) References Cited

U.S. PATENT DOCUMENTS

| | | | | |
|---|---|---|---|---|
| 2,872,553 A | * | 2/1959 | Hatfield | 338/175 |
| 4,512,567 A | * | 4/1985 | Phillips | 463/37 |
| 4,637,605 A | | 1/1987 | Ritchie | |
| 4,709,917 A | * | 12/1987 | Yang | 482/63 |
| 5,829,745 A | * | 11/1998 | Houle | 273/148 B |
| 6,561,952 B2 | * | 5/2003 | Wu | 482/3 |
| 6,910,991 B2 | | 6/2005 | Matsumoto | |
| 6,918,860 B1 | * | 7/2005 | Nusbaum | 482/57 |
| 7,185,905 B2 | * | 3/2007 | Czysz | 280/276 |
| 7,313,943 B2 | * | 1/2008 | Smith | 73/1.79 |
| 2003/0171190 A1 | * | 9/2003 | Rice | 482/57 |

* cited by examiner

*Primary Examiner* — Steve R Crow

(57) ABSTRACT

One embodiment of an improved self-centering mechanism restoring the handlebar or control of an electronic exercise bicycle or video game bike to the straight ahead position when the rider removes his hands from the handlebars or controls. The self-centering mechanism is configured with a compression spring (52) assisting and pressurizing a mechanical device comprised of two opposing circular ball ramps (32) and (44) with radial tapered depth grooves (42). Round balls (40) of similar diameter to the radius of the depth grooves (42) are situated in the grooves (42) between the opposing ball ramps (32) and (44). The compression spring (52) is located over a connecting bolt (56) which connects the ball ramps (32) and (44) to a shaft (26) that is supported with bearings (22) and (28) in a housing (24). Below the spring assembly is the mount assembly for the potentiometer (66), which sends the data signals communicating the rotation amount of the handlebars to the video game. The anti-rotation pin (62), which is stabilized by mount for anti-rotation pin (60), prevents potentiometer (66) from rotating as a result of anti-rotation plate (64) riding against anti-rotation pin (62). Other embodiments are described.

3 Claims, 5 Drawing Sheets

SELF CENTERING STEERING MECHANISM

CROSS-REFERENCE TO RELATED APPLICATIONS

This application claims the benefit of provisional patent application Ser. No. 60/902,965 filed Feb. 24, 2007 by the present inventor.

FEDERALLY SPONSORED RESEARCH OR DEVELOPMENT

Not Applicable

SEQUENCE LISTING OR COMPUTER PROGRAM

Not Applicable

BACKGROUND

1. Field of Invention

This invention relates to the steering mechanism of exercise bicycles and video game bikes, specifically to an improved self centering steering mechanism for electronic exercise bicycles or video game bikes.

2. Prior Art

Electronic exercise bicycles and video game bikes are used to provide entertainment while exercising. Steering which provides total simulation of the cycling experience within the video game is critical for the enjoyment of the game and consequently for the completion of the exercise session. A vital component of steering is self centering. Self centering is the action of the handlebars returning to a straight ahead position when the rider removes his hands from the handlebars. Self-centering is important to the function and maneuverability of the rider's character in the video game, and therefore, necessary for the enjoyment of the exercise session.

Ritchie, in U.S. Pat. No. 4,637,605 issued Jan. 20, 1987, refers to a spring mechanism in FIG. 10 intending to cause the handlebars to move to a neutral position as soon as they are released. However, no claims are made with respect to the mechanism and no information is provided concerning the type of spring used or how the return to neutral position would be accomplished.

Nusbaum, in U.S. Pat. No. 6,918,860 issued Jul. 19, 2005, discloses a handlebar self centering mechanism which includes at least one spring, but preferably two opposing springs, suspended between a primary frame and a steer frame of an exercise bicycle (see springs 60 in FIGS. 4 and 15). These are coil type extension springs, which tend to break at the ends where the spring has been changed from the original coil it was wound in and reformed to have a loop end that becomes the attachment point. Often the failure is in the area from the last coil of the spring through the end of the connecting loop. This may result from the bending to reform the spring or from the constant use and tension on the ends of the spring since the ends are under the most and constant use during the operation of the spring.

Furthermore, this mechanism is not self contained or built strong enough for use in a commercial environment, as is the present embodiment.

Matsumoto, in U.S. Pat. No. 6,910,991 issued Jun. 28, 2005, discloses a restoring mechanism configured with a coil spring wound around a shaft. FIGS. 4 and 5 disclose the coil spring with a hook securing one end of the spring to a shaft by means of bolt and a hook securing the other end of the spring to a tube by means of a bolt. This mechanism also experienced problems with failure.

Like the Nusbaum spring, above, the Matsumoto spring has loop ends which fail, both from manufacturing and from stress. In addition, this spring return design tries to unwind the spring every time the unit is turned to the right, which goes against the properties set in as a result of being wound in a counter clockwise direction when manufactured. This unwinding action causes a weakness in the spring. Furthermore, there is no way of positioning the unit at center in a positive way if the user turned the handlebars to the extreme left or right. Therefore, the release of the handlebars from such a position causes the steering mechanism to spring past center back and forth until the kinetic energy is dissipated. Moreover, the stops in the mechanism are another weak area. As a result of all the foregoing, this mechanism does not withstand use in a commercial environment.

Thus, existing steering mechanisms utilize linear pole springs or compression/extension springs alone to return the device to center. Both of these experience problems such as breakage.

SUMMARY

In accordance with one embodiment, a self-centering steering mechanism which includes a compression spring assisting and pressurizing a mechanical device comprised of two opposing circular ball ramps with tapered depth grooves.

Preferably, there are two or more depth grooves around the face of each ramp. Round balls of similar diameter to the radius of the grooves are situated in the grooves between the opposing ramps. Here, component parts, as well as the compression spring, keep a constant and increasing pressure on the ramps, thereby creating the self-centering action.

Here, the ball ramps are connected mechanically to a shaft which is supported with bearings in a housing. This provides smoothness of action and centering of the self centering mechanism. On either end of the self centering mechanism, a mechanical or optical connection is made to send the data signals necessary to transfer the rotation amount of the handlebars to complete video game interface.

DRAWINGS

Figures

Figure 1:
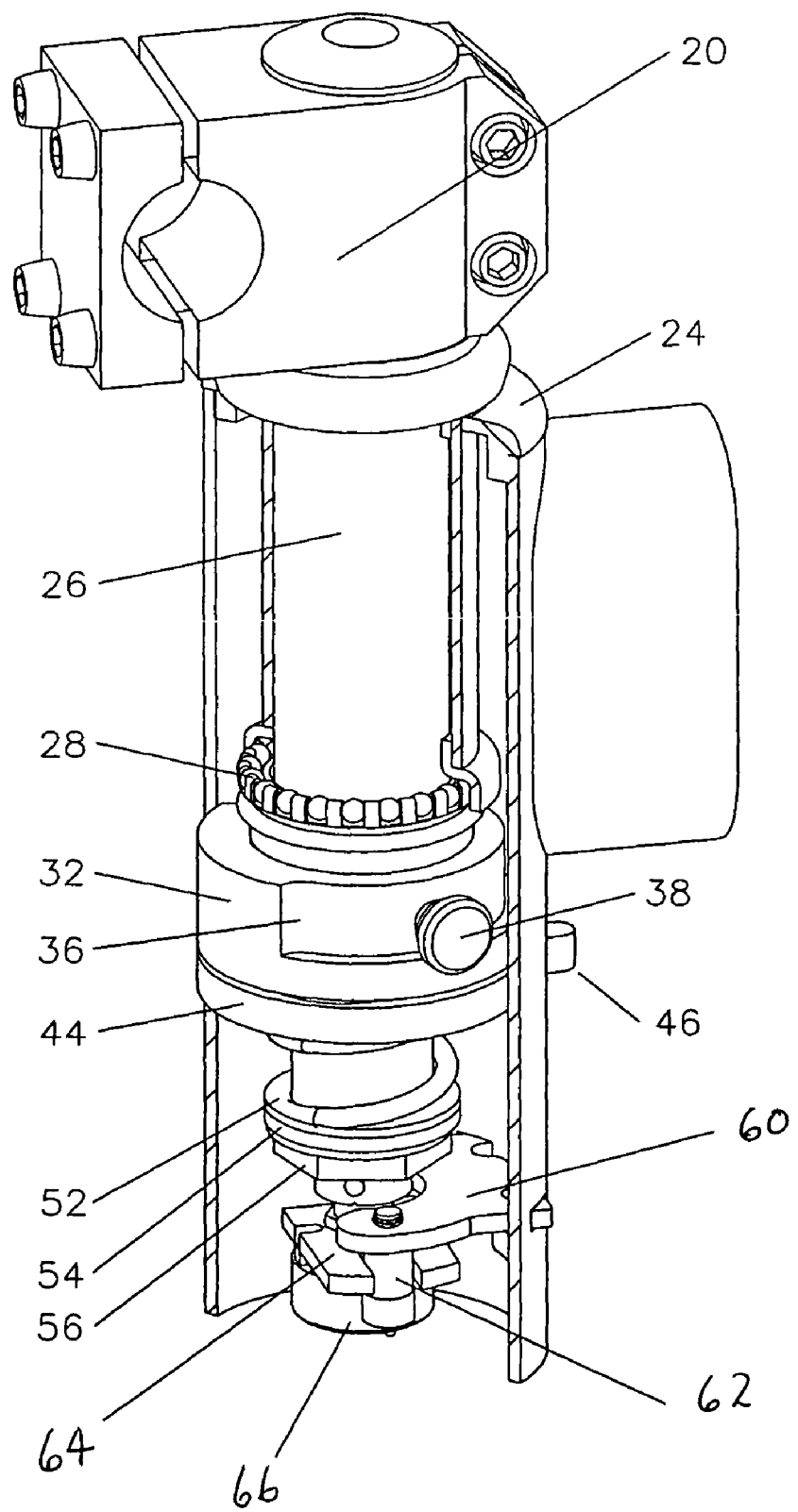
FIG. 1 shows a semi-assembled elevated cut away view of the steering mechanism.

REFERENCE NUMERALS 20 handle bar mount
22 bearings
24 housing
26 shaft
28 bearings
30 alignment blocks
32 top ball ramp
34 opening on upper side of top ball ramp
36 stop step 38 stop pin
40 balls
42 depth grooves
44 bottom ball ramp
46 tab
48 slot in housing
50 thrust washer
52 compression spring
54 thrust washer
56 connecting bolt
58 potentiometer adapter
60 mount for anti-rotation pin
62 anti-rotation pin
64 anti-rotation plate
66 potentiometer

DETAILED DESCRIPTION

Preferred Embodiment

Figure 2:
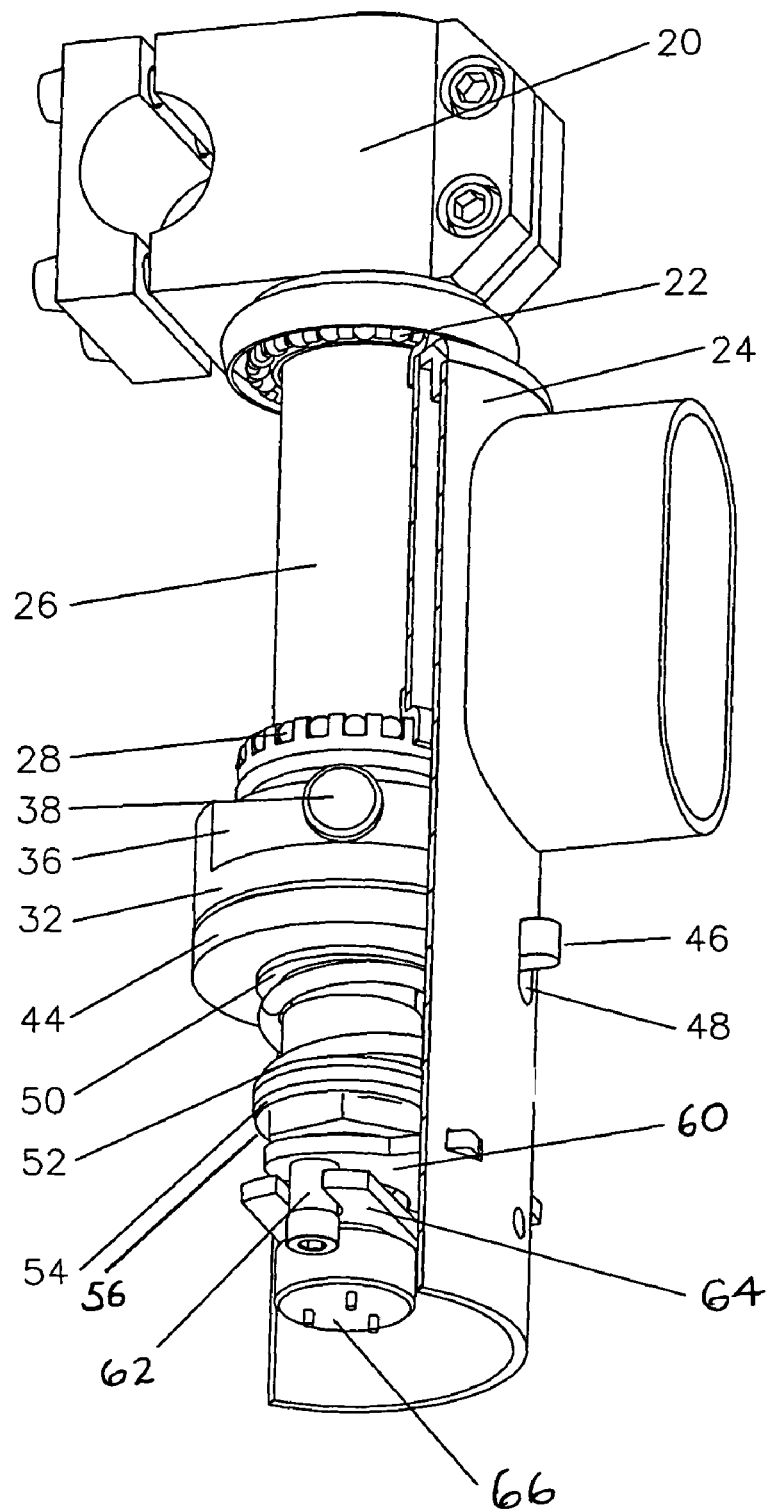
FIG. 2 shows a semi-assembled cut away view of the steering mechanism
Figure 3:
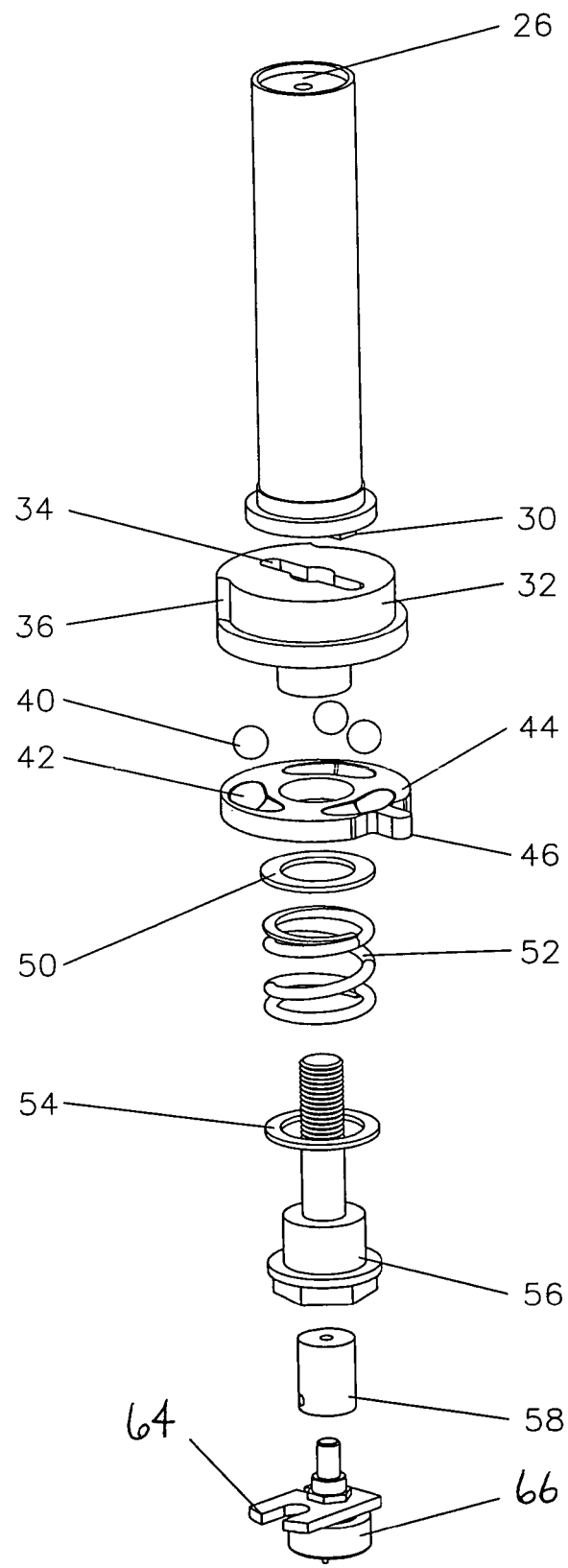
FIG. 3 shows an exploded view of the steering mechanism.
Figure 4:
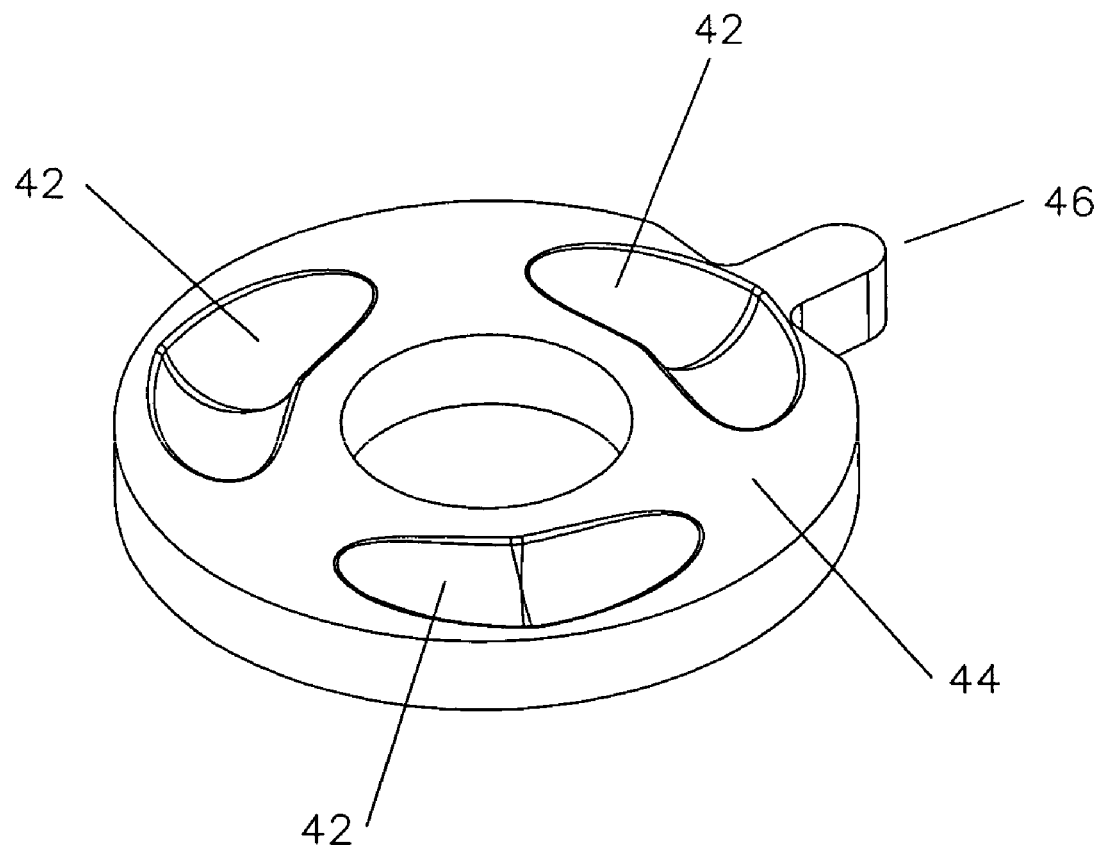
FIG. 4 shows the bottom ball ramp.
Figure 5:
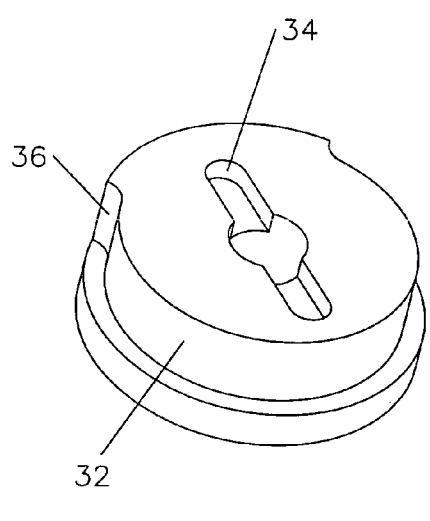
FIG. 5 shows the upper side of the top ball ramp.
Figure 6:
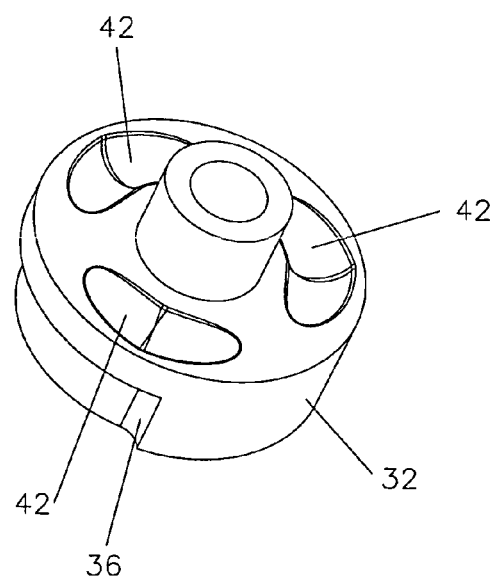
FIG. 6 shows the lower side of the top ball ramp.

An embodiment of a self centering steering mechanism for handlebars of exercise bicycles or game bikes in accordance with the present invention will be described with reference to FIGS. 1-6.

A self centering steering mechanism in accordance with the present embodiment is configured with a compression spring assisting and pressurizing a mechanical device comprised of two opposing circular ball ramps with radial tapered depth grooves.

Under handle bar mount 20, enclosed in housing 24, is shaft 26. In the present embodiment, the end of shaft 26 has two alignment blocks 30 that fit into opening 34 on the upper side of top ball ramp 32. Three balls 40 are positioned between top ball ramp 32 and bottom ball ramp 44 in three radial tapered depth grooves 42 evenly spaced around the face of top ball ramp 32 and bottom ball ramp 44. The round balls 40 are of similar diameter to the radius of depth grooves 42 in top ball ramp 32 and bottom ball ramp 44.

Stop step 36 is integrated in top ball ramp 32. Stop pin 38 is set in and attached to an indentation in housing 24 (although shown floating). Tab 46 is located on bottom ball ramp 44, which fits through slot 48 in housing 24. Under bottom ball ramp 44, is thrust washer 50. Under thrust washer 50 is compression spring 52, which is wound around the outer circumference of connecting bolt 56, with thrust washer 54 below compression spring 52.

Under connecting bolt 56 is potentiometer adapter 58. Next to potentiometer adapter 58 is mount for anti-rotation pin 60, which is mounted onto housing 24. The mount for anti-rotation pin 60 connects to anti-rotation pin 62, which is docked in anti-rotation plate 64. Below anti-rotation plate 64 is potentiometer 66.

Operation

Preferred Embodiment

In the configuration described above, the user will move the handlebars of the bicycle to control the user's movements during the video interaction. As the shaft 26 is rotated from the at rest or self centered position, in either direction, the bottom ball ramp 44 is kept in a no rotational position by the tab 46 which is inserted in a slot 48 in housing 24. This decreases the area the balls 40 are contained in and forces bottom ball ramp 44 away from opposing top ball ramp 32, increasing the pressure against spring 52. The further shaft 26 is rotated, the area in which the balls are captured continues to decrease and the greater the distance the balls 40 will move in depth grooves 42, which in turn creates more pressure on spring 52 against top ball ramp 32.

There are two limiting factors on the amount of rotation that shaft 26 may be turned in either direction. First, a primary stop pin 38 set in housing 24 will contact stop step 36, which is integrated in top ball ramp 32 when shaft 26 is rotated 50 degrees in either direction. Secondly, as bottom ramp 44 is forced away from top ramp 32, a mechanical stop is created by the shoulder on connecting bolt 56 that contacts thrust washer 50, which contacts bottom ramp 44 when it has reached its maximum allowable travel to keep balls 40 between top ball ramp 32 and bottom ball ramp 44.

Below connecting bolt 56 is potentiometer adapter 58. Next to potentiometer adapter 58 is mount for anti-rotation pin 60, which is mounted onto housing 24. The mount for anti-rotation pin 60 connects to anti-rotation pin 62, which is docked in anti-rotation plate 64. Anti-rotation plate 64 floats above potentiometer 66 within housing 24. Potentiometer 66 is kept from rotating by means of anti-rotation plate 64 riding against anti-rotation pin 62. Potentiometer 66 sends the data signals necessary to transfer the rotation amount of the handlebars to complete the video game interface.

This embodiment is designed to withstand the rigors of a commercial environment. Instead of relying on a single spring as shown in the prior art, this embodiment utilizes a fortified steering mechanism which combines a compression spring with a mechanical device consisting of two opposing ball ramps.

Furthermore, heavy mechanical stops between the top ball ramp and outer housing, along with a secondary stop built into the ball ramp and the shoulder of the threaded connecting bolt, provide a robust design.

Description

Additional Embodiment

Additional embodiments include mechanisms in which the handlebars and handlebar mount are replaced with a steering wheel or other type of control.

Other embodiments include using other types of compressible materials, such as rubber, air, oil or magnet fields, instead of the compression spring.

Further embodiments include replacing the potentiometer with optical or Hall effect sensors to accomplish the same direction-sensing task without a mechanical connection.

The mechanical or optical connection to send the data signals necessary to transfer the rotation amount of the handlebars to complete video game interface can be made on either end of the self-centering mechanism in other embodiments.

CONCLUSIONS, RAMIFICATIONS, AND SCOPE

Thus, the reader will see that the improved self centering device of the various embodiments can be used on an electronic exercise bicycle or video game bike, providing more accurate steering control and motion by the rider within the video game experience, which is critical for the enjoyment of the game and therefore for the completion of the exercise session.

Furthermore, the self-centering mechanism has additional advantages in that it utilizes a fortified steering mechanism which combines a compression spring with a mechanical device consisting of two opposing ball ramps and thus is stronger than mechanisms utilizing linear pole springs or compression/extension springs alone to return the device to center, and will stand up to the force exerted by users in a commercial environment and will function over extended time periods.

In addition, heavy mechanical stops built into the top ball ramp and outer housing, along with a secondary stop built into the ball ramp and the shoulder of the threaded connecting bolt of the self centering steering mechanism provide a robust design.

Although the invention has been described and illustrated in detail, these details should not be construed as limiting the scope of the embodiment but merely providing illustrations of some of the presently preferred embodiments. The scope of the embodiment should be determined by the appended claims, not by the examples given.

What is claimed is:

1. A self centering mechanism for exercise bicycles, electronic bicycles, or game bikes restoring the steering from a turned position to an initial position when
    a user releases a steering control, comprising
    a shaft operating said steering control,
    a compression spring wound around the outer circumference of a connecting bolt,
    a mechanical device comprised of two opposing ball ramps with balls between said ball ramps in depth grooves, and with said ball ramps being connected mechanically by said bolt to said shaft; further including a connection to send data signals necessary to transfer the amount of rotation of said steering control to a video game interface.

2. A method of restoring the steering control of an exercise or electronic bicycle from a rotated position to an initial position comprising,
    a. providing a shaft operating a steering control,
    b. providing a compression spring wound around the outer circumference of a connecting bolt,
    c. providing a mechanical device comprised of two opposing ball ramps with balls between said ball ramps in depth grooves,
    d. providing said ball ramps being connected mechanically by said bolt to said shaft,
    whereby said shaft returns to said initial position upon being released from said rotated position; further including a connection to send data signals necessary to transfer the amount of rotation of said steering control to a video game interface.

3. A mechanism, restoring device, or method of restoring the steering control as in claim 1 or 2 further including mechanical stops integrated into said ball ramps and said shaft.

* * * * *